(12) United States Patent
Chen et al.

(10) Patent No.: US 11,249,840 B2
(45) Date of Patent: *Feb. 15, 2022

(54) DATA STORAGE DEVICES AND METHODS FOR REBUILDING A MEMORY ADDRESS MAPPING TABLE

(71) Applicant: Silicon Motion, Inc., Jhubei (TW)

(72) Inventors: Ching-Ke Chen, Zhubei (TW); Tsu-Jung Chiang, New Taipei (TW)

(73) Assignee: Silicon Motion, Inc., Jhubei (TW)

( * ) Notice: Subject to any disclaimer, the term of this patent is extended or adjusted under 35 U.S.C. 154(b) by 77 days.

This patent is subject to a terminal disclaimer.

(21) Appl. No.: 16/825,501

(22) Filed: Mar. 20, 2020

(65) Prior Publication Data

US 2020/0218602 A1 Jul. 9, 2020

Related U.S. Application Data

(63) Continuation of application No. 15/858,393, filed on Dec. 29, 2017, now Pat. No. 10,635,525.

(30) Foreign Application Priority Data

Apr. 25, 2017 (TW) .............................. TW106113731

(51) Int. Cl.
*G06F 11/10* (2006.01)
*G06F 12/02* (2006.01)
*G06F 11/14* (2006.01)

(52) U.S. Cl.
CPC ...... *G06F 11/1016* (2013.01); *G06F 11/1068* (2013.01); *G06F 11/14* (2013.01); *G06F 11/1458* (2013.01); *G06F 12/0246* (2013.01); *G06F 2212/7201* (2013.01); *G06F 2212/7202* (2013.01)

(58) Field of Classification Search
CPC .. G06F 11/1016; G06F 11/1458; G06F 11/14; G06F 12/0246; G06F 11/1068; G06F 2212/7201; G06F 2212/7202; G06F 12/0292; G06F 2212/1032
USPC ....................................................... 714/6.13
See application file for complete search history.

(56) References Cited

U.S. PATENT DOCUMENTS

| 10,635,525 B2* | 4/2020 | Chen ................... G06F 11/1016 |
| 2007/0016719 A1 | 1/2007 | Ono et al. |
| 2013/0124782 A1 | 5/2013 | Huang |
| 2013/0262747 A1 | 10/2013 | Chang |
| 2015/0186225 A1 | 7/2015 | Lin et al. |

(Continued)

FOREIGN PATENT DOCUMENTS

| CN | 101046803 A | 10/2007 |
| CN | 103377143 A | 10/2013 |
| CN | 103631721 A | 3/2014 |

(Continued)

*Primary Examiner* — Yair Leibovich
(74) *Attorney, Agent, or Firm* — Wang Law Firm, Inc.

(57) ABSTRACT

A data storage device including a non-volatile memory and a micro-controller is provided. The non-volatile memory includes a plurality of data blocks. The micro-controller selects one of the data blocks as a source block and another one of the data blocks as a destination block. Also, the micro-controller duplicates data in the source block to the destination block, and when the data is corrupted and unrecoverable, stores an unrecoverable-error bit corresponding to the data into the destination block.

11 Claims, 4 Drawing Sheets

(56) References Cited

U.S. PATENT DOCUMENTS

2016/0124820 A1\* 5/2016 Lin .................. G06F 3/0679
714/6.12

FOREIGN PATENT DOCUMENTS

| CN | 103902406 A | 7/2014 |
| CN | 104166636 A | 11/2014 |
| CN | 104750625 A | 7/2015 |
| CN | 105740157 A | 7/2016 |
| TW | 201339835 A | 10/2013 |

\* cited by examiner

DATA STORAGE DEVICES AND METHODS FOR REBUILDING A MEMORY ADDRESS MAPPING TABLE

CROSS REFERENCE TO RELATED APPLICATIONS

This Application is a continuation of U.S. application Ser. No. 15/858,393, filed on Dec. 29, 2017, which claims priority to Taiwan Application No. 106113731, filed on Apr. 25, 2017, the entirety of which are incorporated by reference herein.

BACKGROUND OF THE APPLICATION

Field of the Application

The application relates generally to data recovery techniques, and more particularly, to data storage devices and methods for rebuilding a memory address mapping table.

Description of the Related Art

Due to advancements in computer technology, various mass storage devices have been developed, wherein memory is the most widely used type of storage medium of all. Memory can be categorized into two major types based on its physical characteristics: volatile memory and non-volatile memory. Volatile memory requires an active power source to function. When the power source goes off, the content of the volatile memory is lost. In contrast to the volatile memory, non-volatile memory can retain its content without power being applied and the content can be accessed with power being applied.

Non-volatile memory is widely used in electronic devices, especially portable electronic devices (e.g., mobile phones, digital cameras, and handheld game consoles, etc.), for long-term data storage. Nowadays, there are various types of non-volatile memory available on the market, including flash memory, magneto-resistive Random Access Memory (RAM), ferroelectric RAM, resistive RAM, and Spin Transfer Torque (STT) RAM, etc.

During the operation of non-volatile memory, memory address mapping tables are maintained for managing the mapping relationships between the logical addresses used by the host and the physical addresses in the memory, and through which correct access to the content of the memory can be realized. However, the content of the memory, including the memory address mapping tables, may be corrupted due to improper power-offs or sudden power failures. Therefore, it is desirable to have a solution for corrupted memory address mapping tables.

BRIEF SUMMARY OF THE APPLICATION

In order to solve the aforementioned problem, the present application proposes to duplicate the UNCorrectable(UNC)-error bit in the logical-to-physical address mapping table to the physical-to-logical address mapping table and/or to the spare area of the data page, so that, when the logical-to-physical address mapping table is corrupted, the UNC-error bit therein can be timely recovered during the rebuild process of the logical-to-physical address mapping table.

In one aspect of the application, a data storage device comprising a non-volatile memory and a micro-controller is provided. The non-volatile memory comprises a plurality of data blocks. The micro-controller is configured to select one of the data blocks as a source block and another one of the data blocks as a destination block, duplicate data in the source block to the destination block, and when the data is corrupted and unrecoverable, store an unrecoverable-error bit corresponding to the data into the destination block.

In another aspect of the application, a data storage device comprising a non-volatile memory and a micro-controller is provided. The non-volatile memory comprises a plurality of data blocks. The micro-controller is configured to read a respective physical-to-logical address mapping table comprising an unrecoverable-error bit from each of the data blocks, and build a logical-to-physical address mapping table comprising the unrecoverable-error bits according to the physical-to-logical address mapping tables in an order of precedence.

In yet another aspect of the application, a method for a data storage device to rebuild a memory address mapping table is provided. The method comprises the steps of: providing a non-volatile memory in the data storage device, which comprises at least one system information block and at least one data block in the data storage device; and when a logical-to-physical address mapping table in the system information block is corrupted, reading an unrecoverable-error bit from a physical-to-logical address mapping table in the data block or a spare area of a data page in the data block, to rebuild the logical-to-physical address mapping table.

Other aspects and features of the application will become apparent to those with ordinary skill in the art upon review of the following descriptions of specific embodiments of the data storage devices and methods for rebuilding a memory address mapping table.

BRIEF DESCRIPTION OF THE DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof.

There are various types of non-volatile memory, including flash memory, magneto-resistive Random Access Memory (RAM), ferroelectric RAM, resistive RAM, and Spin Transfer Torque (STT) RAM, etc., and all of them are capable of long-term data storage. The following description is made by using the flash memory as an example for the purpose of illustration, and the present application should not be limited thereto.

In recent years, flash memory has been widely adopted as one of the major forms of storage media in data storage devices, such as memory cards, Universal Serial Bus (USB) flash drives, and Solid State Drives (SSDs), etc. One of the applications of flash memory is to use the technique of Multi Chip Package (MCP) to incorporate a flash memory and its controller into a single chipset which may be referred to as an embedded MultiMedia Card (eMMC).

The data storage devices adopting flash memory as a storage medium may be used in various types of electronic devices, including mobile phones, wearable devices, panel Personal Computers (PCs), and Virtual Reality (VR) equipment. The Central Processing Units (CPUs) in those electronic devices are generally considered as the hosts operating the data storage devices therein.

Figure 1:
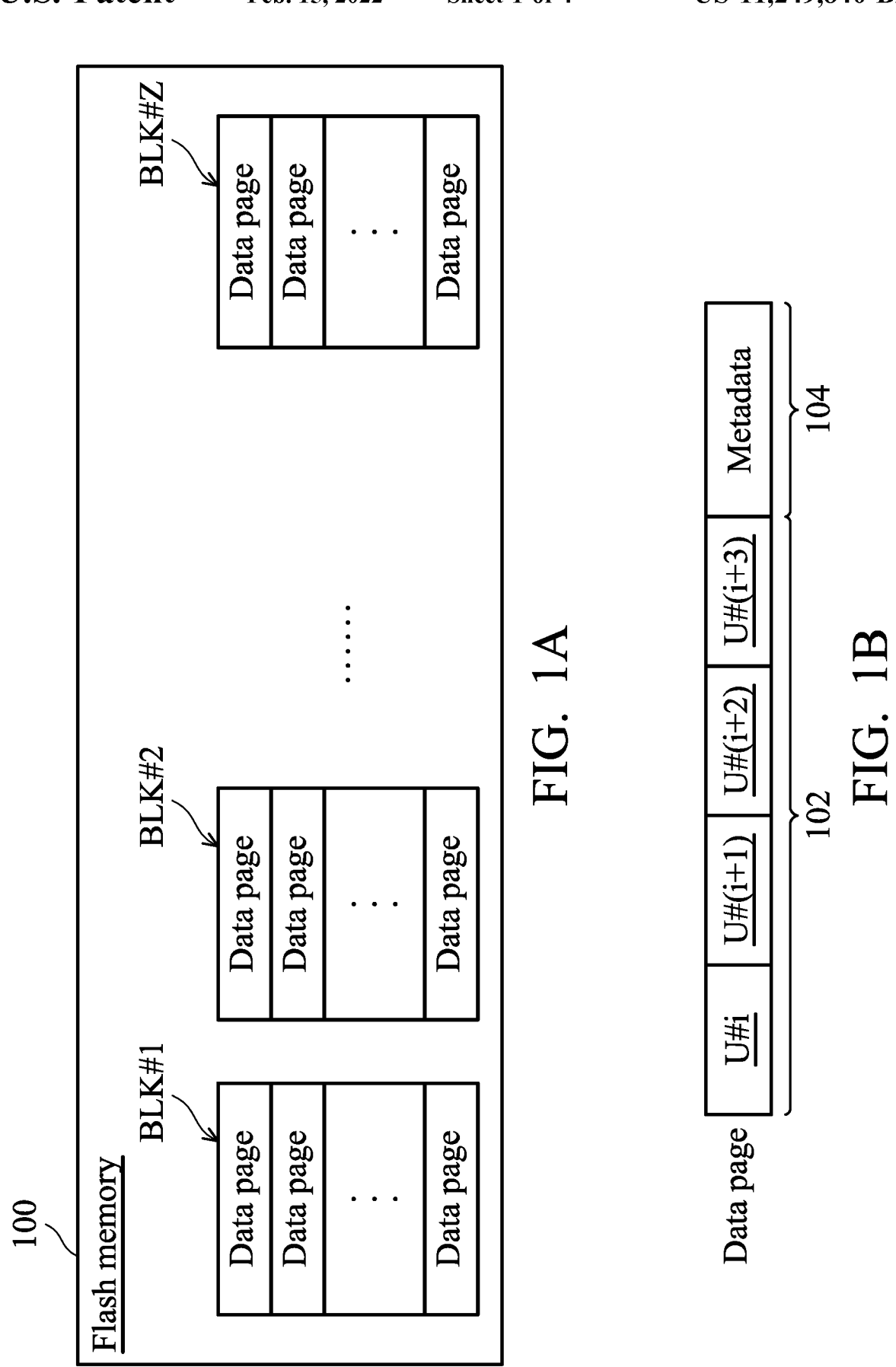
FIGS. 1A and 1B are schematic diagrams illustrating the physical layout of a flash memory according to an embodiment of the application.

FIGS. 1A and 1B are schematic diagrams illustrating the physical layout of a flash memory according to an embodiment of the application.

As shown in FIG. 1A, the storage space in the flash memory 100 may be divided into a plurality of physical blocks BLK #1, BLK #2, BLK #Z, wherein Z is a positive integer. Each physical block includes a plurality of physical pages (also called data pages). For example, there may be 256 data pages in each physical block.

As shown in FIG. 1B, each data page includes a data area 102 and a spare area 104. The data area 102 includes a plurality of storage units U #i, U #(i+1), U #(i+2), and U #(i+3), and after being allocated, each storage unit corresponds to one or more logical addresses used by the host. The logical addresses may be presented in various forms, such as Logical Block Addresses (LBAs) or indexed by Global Host Pages (GHPs).

In one embodiment, the size of the data area 102 is 16 Kilo-Byte (KB), and the size of each storage unit therein is 4 KB, wherein each storage unit corresponds to 8 logical addresses (e.g., LBA #0~LBA #7) or 1 GHP.

The spare area 104 stores metadata of the current data page, wherein the metadata includes a block identification and mapping information. The block identification stores the identification of the physical block to which the current data page belongs. The mapping information indicates the logical addresses corresponding to the storage units U #i, U #(i+1), U #(i+2), and U #(i+3). For example, the mapping information may include 4 sections of LBAs (each section contains 8 LBAs) or indices of 4 GHPs. The following description is made by using the GHP indices as an example for the purpose of illustration, and the present application should not be limited thereto.

Figure 2:
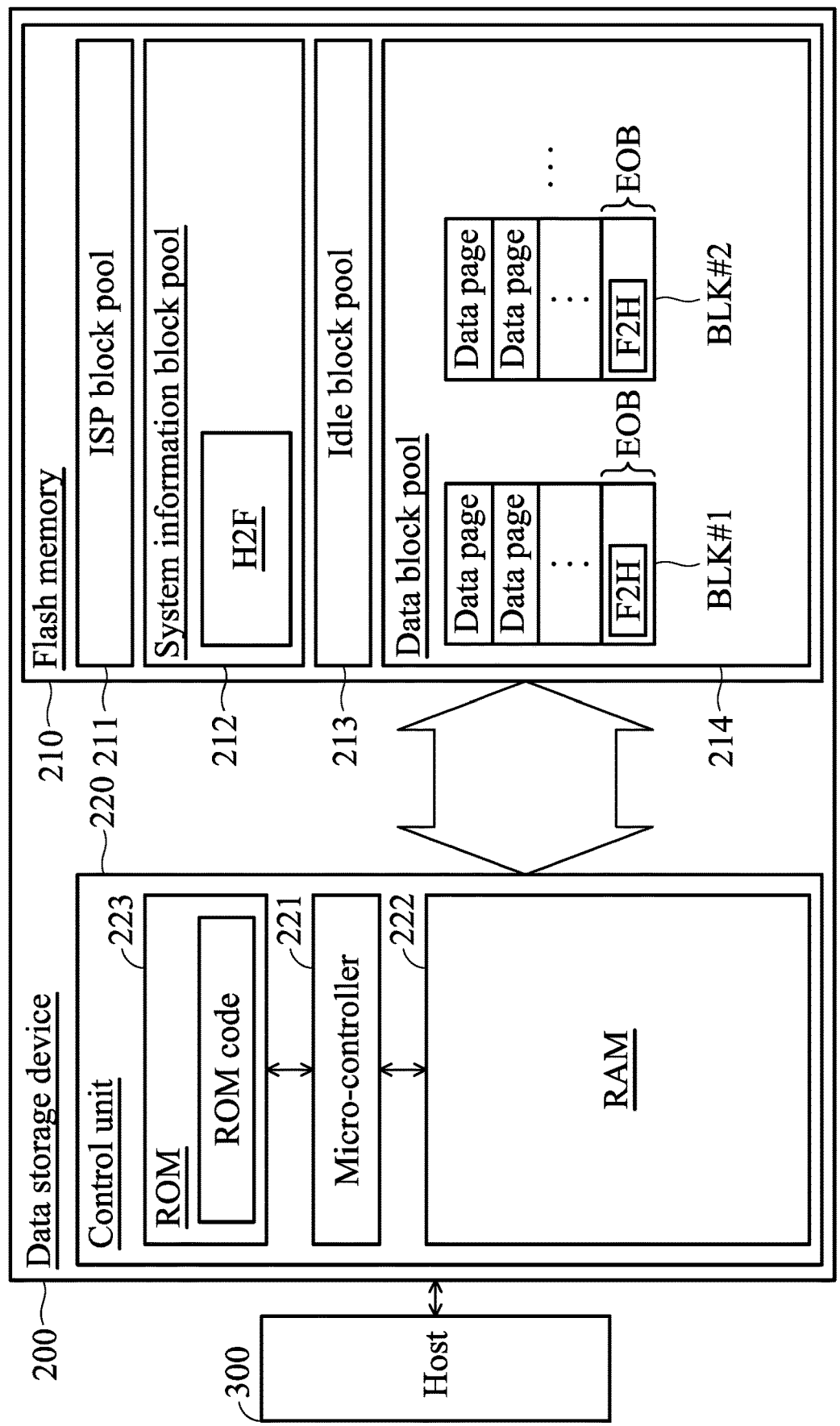
FIG. 2 is a block diagram illustrating a data storage device according to an embodiment of the application.

FIG. 2 is a block diagram illustrating a data storage device according to an embodiment of the application. The data storage device 200 includes a flash memory 210 and a control unit 220, wherein the control unit 220 is coupled between a host 300 and the flash memory 210, and operates the flash memory 210 according to the instructions (e.g., "read", "write", or "reset", etc.) issued by the host 300.

The control unit 220 includes a micro-controller 221, a RAM 222, and a Read-Only Memory (ROM) 223, wherein the micro-controller 221 and the RAM 222 may be packaged into a single die or may be disposed in separate dice. For example, if the data storage device 200 is a Secure Digital (SD) card, the RAM 222 may be a 512 KB Static RAM (SRAM).

The ROM 223 is used to store read-only program code (e.g., ROM code). The micro-controller 221 may load and execute the read-only program code from the ROM 223 and/or the In-System Programming (ISP) code from the ISP block pool 211 of the flash memory 210, for operations, including managing the mapping between the logical addresses used by the host 300 and the physical addresses in the flash memory 210, wherein the mapping include a Host-to-Flash (H2F) mapping table and a respective Flash-to-Host (F2H) mapping tables of each data block in the flash memory 210. The RAM 222 may serve as a dynamic data buffer for the operations of the micro-controller 221.

The flash memory 210 includes an ISP block pool 211, a system information block pool 212, an idle block pool 213, and a data block pool 214.

The blocks in the system information block pool 212 are used to store system information, including non-volatile storage of the H2F mapping table. Regarding detailed description of the H2F mapping table, reference may be made to FIG. 3.

The blocks in the idle block pool 213 are allocated by the micro-controller 221 to store data. For example, the blocks in the idle block pool 213 may be used to store the data written from the host 300, or may serve as destination blocks for the garbage collection process. Once a block in the idle block pool 213 has finished the data storing (e.g., the block is full or suspended), it may be re-allocated as a data block in the data block pool 214.

The blocks in the data block pool 214 may be referred to as data blocks, each of which provides a storage space defined by physical addresses, and the data blocks are where the data that the host 300 wishes to access is stored. A respective F2H mapping table is stored in the End of Block (EOB) of each data block, and preferably, the EOB refers to the last data page of each data block.

During the operation of the data storage device 200, the control unit 220 will dynamically manage the memory address mapping tables, including the H2F mapping table and the F2H mapping tables. The H2F mapping table may be indexed by GHPs and store the information indicating the physical addresses to which the data of the GHPs is stored. That is, each physical address specifies a data page in a data block and/or a storage unit in a data page. The F2H mapping table stores the information indicating the GHP corresponding to the data page with which the F2H mapping table is associated. Thus, the memory address mapping tables are important references for the operation of the data storage device 200.

Figure 3:
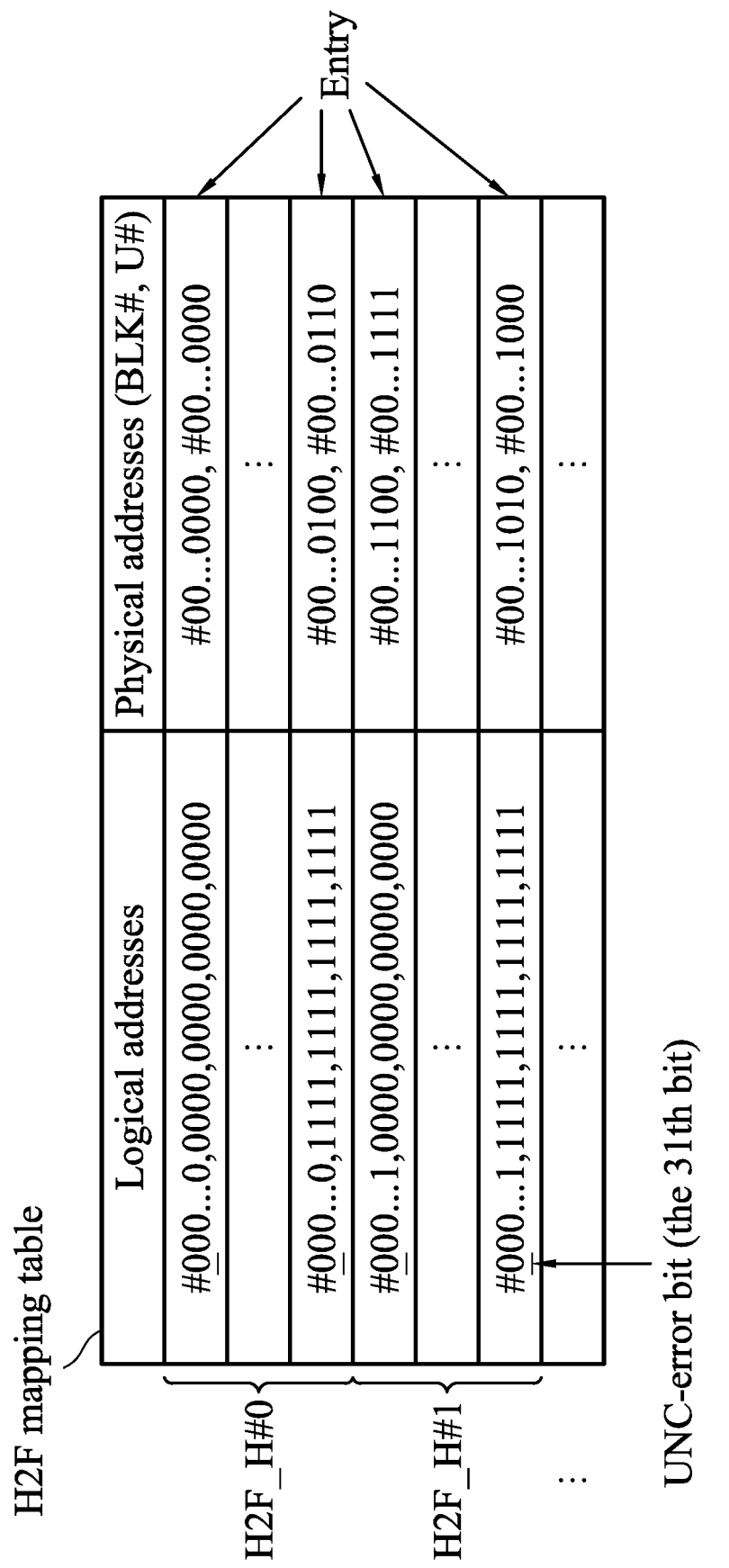
FIG. 3 is a schematic diagram illustrating a H2F mapping table indexed by logical addresses according to an embodiment of the application.

FIG. 3 is a schematic diagram illustrating a H2F mapping table indexed by logical addresses according to an embodiment of the application. Each entry in the H2F mapping table stores the information indicating the physical address (represented by the index BLK # of a data block and the index U # of a storage unit in the data block) in the flash memory 100, to which the data of a logical address is stored. In one embodiment, both the size of a logical address and the size of a physical address are 32 bits, wherein the size of the index BLK # is 16 bits and the size of the index U # is 16 bits. In order to adapt to situations in which the storage space of the flash memory 100 is vast, the entries in the H2F mapping table may be divided into a plurality of host-block mapping tables (denoted as H2F_H #0 and H2F_H #1 in FIG. 3). In one embodiment, the size of each host-block mapping table is 64 KB. The host-block mapping tables may be managed in a pointer list.

In the present application, each entry in the H2F mapping table further stores an UNCorrectable(UNC)-error bit, in addition to storing the mapping between a GHP and a physical addresses. The UNC-error bit indicates whether an uncorrectable error has occurred when the GHP associated with the current entry was read. In one embodiment, any unused or reserved bit of an entry in the H2F mapping table may be used to store the UNC-error bit. In one preferred embodiment, the 31th bit of the logical address in an entry, or the 31th or 15th bit of the physical address in an entry may be used to store the UNC-error bit.

Initially, all the UNC-error bits in the H2F mapping table are set to a default value—"false". When performing a garbage collection process or another data moving process, the data storage device 200 selects a source block and a destination block, wherein the data block with the highest erase count or with an erase count exceeding a threshold in the data block pool 214, or the data block with the highest error-bit count or with an error-bit count exceeding a threshold, may be preferably selected as the source block, and the idle block with the lowest erase count in the idle block pool 213 or any idle block in the queue of the idle block pool 213 may be preferably selected as the destination block. For example, the source block may be physical block BLK #1, and the destination block may be physical block BLK #2. The garbage collection process or another data moving processes is preferably performed in the background of the host 300 operating the data storage device 200. Alternatively, the garbage collection process or other data moving processes may be performed in the foreground of the host 300 operating the data storage device 200. When moving or duplicating data in the source block to the destination block and detecting that the data in the source block is corrupted, the data storage device 200 performs a data recovery procedure to recover the corrupted data. If the data recovery procedure fails, it is determined to be an unrecoverable error and the UNC-error bit in the H2F mapping table, which corresponds to the corrupted data, is set to "true". Next, the data storage device 200 may stop moving or duplicating the data in the source block. Alternatively, the data storage device 200 may continue to move or duplicate the data in the source block to the destination block, and then write the UNC-error bit corresponding to the corrupted data to the spare area 104 in the destination block, and to the F2H mapping table when writing information to the EOB of the destination block. In one embodiment, the data recovery procedure may use Error Correction Codes (ECC) to detect and recover corrupted data. The detailed description of ECC will be addressed later.

After that, when the host 300 wishes to access data with an unrecoverable error, the data storage device 200 may promptly respond to the read request from the host 300 according to the UNC-error bit in the H2F mapping table. Due to the UNC-error bit being "true", the data storage device 200 may skip the data reading process and reply to the host 300 with an error message indicating an unrecoverable error or a read error, without operating the flash memory 210. Advantageously, the performance of the data storage device 200 may be significantly improved. In addition, the present application proposes a method for rebuilding a memory address mapping table, along with rebuilding the UNC-error bits therein.

In the present application, it is not only the H2F mapping table, but also the F2H mapping tables and the spare area of each data page that store the UNC-error bits of the data. Therefore, when the micro-controller 221 needs to rebuild the corrupted H2F mapping table, it may also promptly rebuild the UNC-error bits in the H2F mapping table according to the UNC-error bits in the F2H mapping tables and the spare area of each data page.

Figure 4:
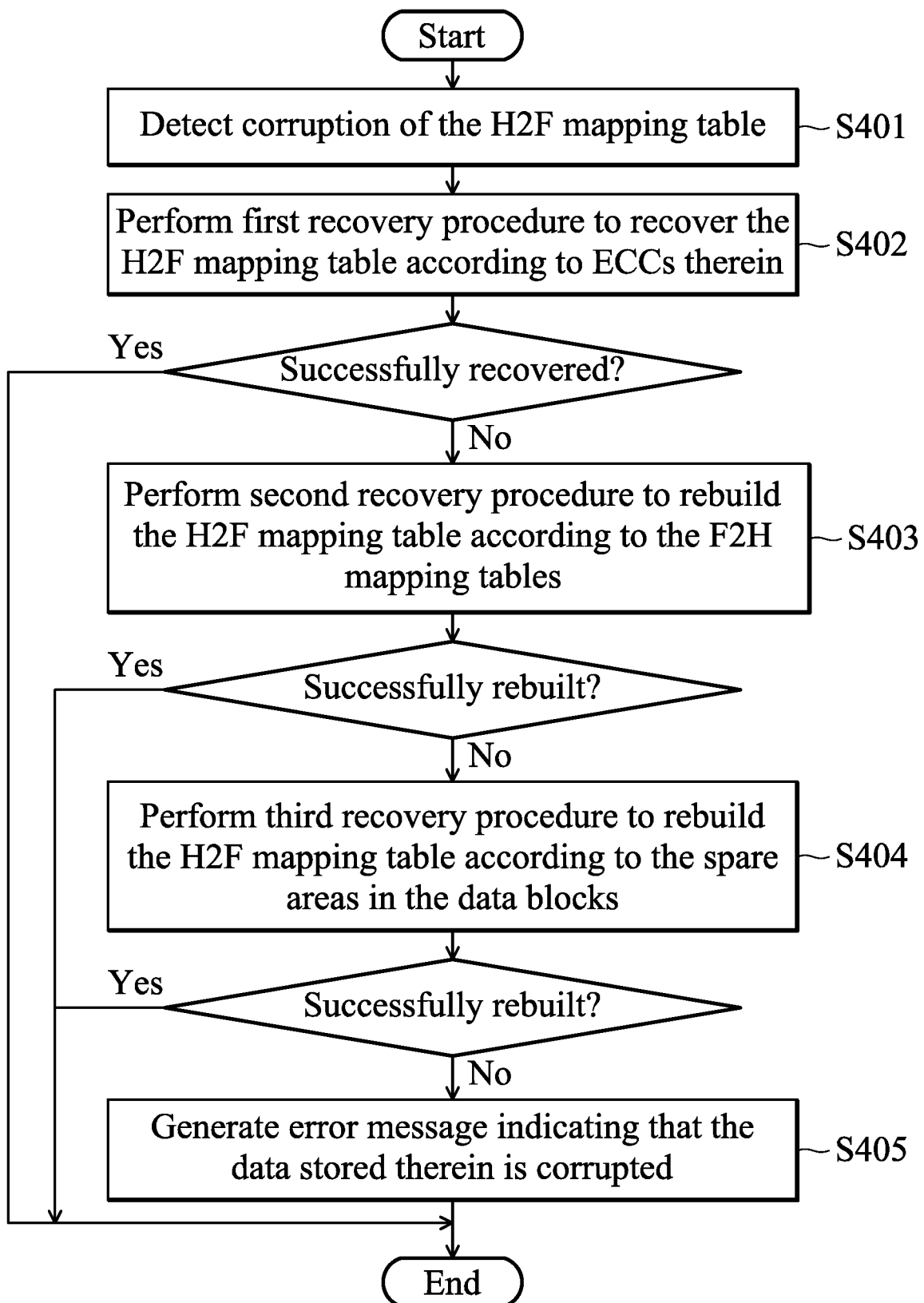
FIG. 4 is a flow chart illustrating the method for rebuilding the H2F mapping table according to an embodiment of the application.

FIG. 4 is a flow chart illustrating the method for rebuilding the H2F mapping table according to an embodiment of the application. In this embodiment, the method for rebuilding the H2F mapping table may be applied to a data storage device, such as the data storage device 200, and it is worth noting that, in this data storage device, it is not only the H2F mapping table, but also the F2H mapping tables and the spare area of each data page that store the UNC-error bits of the data.

To begin with, the data storage device detects that the H2F mapping table is corrupted (step S401), and then performs a first recovery procedure to recover the H2F mapping table according to the ECCs in the H2F mapping table (step S402). Specifically, the mapping information in the H2F mapping table is stored in the data area 102 of the blocks in the system information block pool 212, and the ECCs in the H2F mapping table are stored in the spare area 104 of the blocks in the system information block pool 212.

The H2F mapping table may be corrupted for several reasons, including the transmission line coming loose when reading or writing data from or to the data storage device, or improper power-offs or sudden power failures of the data storage device, or erosion of the memory cells caused by repeated program/erase activities.

In one embodiment, a respective checksum and a respective ECC may be inserted into each word (e.g., having a size of 32 bits) in the H2F mapping table. When data is written into a word, a checksum is calculated according to the data, and later, when data is read from the word, another checksum will be calculated according to the data. If the two checksums do not match, the data stored in the word will be considered as corrupted and the ECC may be used to recover the corrupted data. However, an ECC is only capable of recovering a limited number of corrupted bits in the data, and if there are too many corrupted bits in the data, the first recovery procedure will fail.

Subsequent to step S402, if the first recovery procedure is successfully completed, the method ends. Otherwise, if the first recovery procedure fails, the data storage device performs a second recovery procedure to rebuild the H2F mapping table according to the F2H mapping tables (step S403).

Specifically, the second recovery procedure includes: recovering the mapping of the GHPs to the physical addresses by reversing the mapping of the physical addresses to the GHPs, which are provided by the F2H mapping tables in the data blocks (e.g., the F2H mapping table in the EOB of data block BLK #2); and duplicating the UNC-error bits stored in the F2H mapping tables to the H2F mapping table. Since there may be more than one data block in the data block pool 214, the F2H mapping tables may be used in order of precedence for recovering the H2F mapping table, wherein the order of precedence may be determined according to a link list of the data blocks, or according to the timestamps of the data blocks, which indicate the time at which each data block was established.

Subsequent to step S403, if the second recovery procedure is successfully completed, the method ends. Otherwise, if the second recovery procedure fails, the data storage device performs a third recovery procedure to rebuild the H2F mapping table according to the spare areas in the data blocks (e.g., the spare area 104 of data block BLK #2) (step S404).

Specifically, the third recovery procedure includes: recovering the mapping of the GHPs to the physical addresses by reversing the mapping of the physical addresses to the GHPs, which are provided by the spare areas in the data blocks; and duplicating the UNC-error bits stored in the spare areas to the H2F mapping table.

Subsequent to step S404, if the third recovery procedure is successfully completed, the method ends. Otherwise, if the thirds recovery procedure fails, the data storage device generates an error message indicating that the data stored therein is corrupted (step S405).

In one embodiment, if all of the first to third recovery procedures fail to rebuild the H2F mapping table, then the host (e.g., the host 300) coupled to the data storage device may reset (e.g., re-initialize) the data storage device upon receiving the error message.

While the application has been described by way of example and in terms of preferred embodiment, it should be understood that the application cannot be limited thereto. Those who are skilled in this technology can still make various alterations and modifications without departing from the scope and spirit of this application. Therefore, the scope of the present application shall be defined and protected by the following claims and their equivalents.

What is claimed is:

1. A data storage device, comprising:
   a flash memory, comprising at least one system information block and at least one data block; and
   a micro-controller, configured to read an unrecoverable-error bit from a physical-to-logical address mapping table in the at least one data block or from a spare area of a data page in the at least one data block in response to detecting a logical-to-physical address mapping table in the system information block is corrupted, and rebuild the logical-to-physical address mapping table according to the unrecoverable-error bit.

2. The data storage device as claimed in claim 1, wherein the micro-controller is further configured to read the unrecoverable-error bit from the logical-to-physical address mapping table and store the unrecoverable-error bit in the physical-to-logical address mapping table or the spare area of the data page, in response to writing data to the at least one data block.

3. The data storage device as claimed in claim 1, wherein the micro-controller is further configured to perform a recovery procedure to recover the data in response to an error occurring when reading data from the at least one data block, and set the unrecoverable-error bit in the logical-to-physical address mapping table to true in response to the recovery procedure failing.

4. The data storage device as claimed in claim 1, wherein the logical-to-physical address mapping table comprises information concerning mapping of logical addresses used by a host to physical addresses in the flash memory, and the physical-to-logical address mapping table comprises information concerning mapping of the physical addresses in the flash memory to the logical addresses used by a host.

5. The data storage device as claimed in claim 1, wherein the physical-to-logical address mapping table is stored in an End-Of-Block (EOB) of the at least one data block.

6. The data storage device as claimed in claim 1, wherein the spare area of the data page further stores metadata of each data page in the at least one data block.

7. A method for a data storage device to rebuild a memory address mapping table, comprising:
   providing a flash memory in the data storage device, which comprises a plurality of data blocks; and
   reading a respective physical-to-logical address mapping table comprising an unrecoverable-error bit from each of the data blocks in the flash memory; and
   rebuilding a logical-to-physical address mapping table comprising the unrecoverable-error bits according to the physical-to-logical address mapping tables in an order of precedence, wherein the order of precedence is determined according to a respective timestamp of each of the data blocks.

8. The method as claimed in claim 7, further comprising:
   reading a respective spare area comprising an unrecoverable-error bit from a respective data page in each of the data blocks; and
   rebuilding the logical-to-physical address mapping table comprising the unrecoverable-error bits according to the spare areas in response to that the rebuilding of the logical-to-physical address mapping table according to the physical-to-logical address mapping tables fails.

9. The method as claimed in claim 8, wherein each of the spare area further stores metadata of the data page to which the spare area belongs.

10. The method as claimed in claim 7, wherein the physical-to-logical address mapping tables are stored in a plurality of End-Of-Blocks (EOBs) of the data blocks.

11. The method as claimed in claim 7, wherein the logical-to-physical address mapping table comprises information concerning mapping of logical addresses used by a host to physical addresses in the flash memory, and each of the physical-to-logical address mapping tables comprises information concerning mapping of the physical addresses in the flash memory to the logical addresses used by a host.

* * * * *